3,480,589
POLYESTER OF BENZOPHENONE DICARBOX-
YLIC ACID AND TRIS (2-HYDROXYETHYL)
ISOCYANURATE
Manuel A. Jordan, John F. Meyer, and Edmund J. Za-
lewski, Schenectady, N.Y., assignors to Schenectady
Chemicals, Inc., Schenectady, N.Y., a corporation of
New York
No Drawing. Continuation of application Ser. No.
397,019, Sept. 16, 1964. This application Nov. 6,
1968, Ser. No. 781,684
Int. Cl. C08g 17/08
U.S. Cl. 260—63
7 Claims

ABSTRACT OF THE DISCLOSURE

A polymeric ester of 4,4'-benzophenone dicarboxylic acid and tris (2-hydroxyethyl) isocyanurate is prepared. It is useful for coating electrical conductors. A portion of the acid can be replaced by other polycarboxylic acids, and a portion of the isocyanurate can be replaced by other polyhydric alcohols.

---

This application is a continuation of application Ser. No. 397,019, filed Sept. 16, 1964, and now abandoned.

This invention relates to esters of 4,4'-benzophenone dicarboxylic acid and electrical conductors coated therewith.

4,4'-benzophenone dicarboxylic acid has the formula

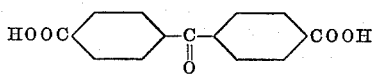

It will be observed that each carboxyl group is attached to an aromatic ring. In contrast p,p'-dicarboxymethyl benzophenone has its carboxyl group attached to aliphatic carbon atoms.

It is an object of the present invention to prepare novel esters of 4,4'-benzophenone dicarboxylic acid.

Another object is to provide improved polyester coatings for electrical conductors.

A further object is to provide wire enamels which after application to the wire exhibit improved resistance to heat shock.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting 4,4'-benzophenone dicarboxylic acid or an ester forming derivative of such acid with tris (2-hydroxyethyl) isocyanurate. Tris (2-hydroxyethyl) isocyanurate has the formula

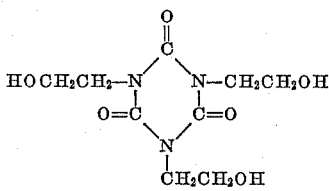

The 4,4'-benzophenone dicarboxylic acid or ester forming derivative thereof can be the sole acid present or there can be added 1, 5, 10, 25 or up to 50 mol percent based on the total carboxylic acid of isophthalic acid or terephthalic acid or ester forming derivatives of such isophthalic acid or terephthalic acid.

The tris (2-hydroxyethyl) isocyanurate can be employed as the sole polyhydric alcohol or it can be replaced in part by one or more other polyhydric alcohols. While as little as 10% of the total polyhydric alcohol can be the tris (2-hydroxyethyl) isocyanurate, preferably at least 50% of the total polyhydric alcohol is the isocyanurate on a weight basis.

On an equivalent percent basis preferably at least 25% of the total polyhydric alcohol is the tris (2-hydroxyethyl) isocyanurate.

In making the polyester usually 15 to 46 equivalent percent is the carboxylic acid reactant and the balance is the polyhydric alcohol, i.e., there should be an excess of alcoholic groups over acid groups. The term equivalent percent is defined for example in Sheffer Patent 2,889,304 and Precopio Patent 2,936,296.

When a modifying polyhydric alcohol is employed, it can be ethylene glycol; glycerine; pentaerythritol; 1,1,1-trimethylolethane; 1,1,1-trimethylolpropane; sorbitol; mannitol; dipentaerythritol; $\alpha,\omega$ aliphatic hydrocarbon diols having 4 to 5 carbon atoms, e.g., butanediol 1,4; pentanediol 1,5; butene 2-diol 1,4; and butyne-2-diol 1,4 and cyclic glycols, e.g. 2,2,4,4-tetramethyl-1,3-cyclobutane diol, hydroquinone di beta hydroxyethyl ether and 1,4-cyclohexanedimethanol.

As the acid reactant there is employed 4,4'-benzophenone dicarboxylic acid or acyl halides thereof, e.g., 4,4'-benzophenone dicarboyl chloride or a lower dialkyl ester thereof, e.g., methyl, ethyl, propyl, butyl, amyl, hexyl and octyl 4,4'-benzophenone dicarboxylates as well as the half esters, e.g., 4,4'-benzophenone dicarboxylic acid mono methylester, as well as mixtures of such esters and acids and/or acid halides. Preferably dimethyl 4,4'-benzophenone dicarboxylate is employed.

When a modifying acid reactant is employed it also can be used as either the free acid, acyl halide, or mono or di lower alkyl ester thereof. Thus as the modifying acid reactant there can be used terephthaloyl dichloride or dimethyl, diethyl, dipropyl, dibutyl, diamyl, dihexyl and dioctyl terephthalates and the corresponding isophthalates, e.g. dimethyl isophthalate as well as the half esters, e.g. monomethyl terephthalate. There can also be used mixtures of such modifying acids, acid halides and/or esters.

To improve abrasion properties of the wire enamel small amounts of metal driers are employed.

While the new polyesters are preferably employed in making wire enamels they are also useful in making molded products and in solution can be used to impregnate cloth, paper, asbestos and the like. They can be employed in general wherever alkyd resins are useful.

The total number of hydroxyl groups on the alcohols normally is 1 to 1.6 times the total number of carboxyl groups on the acids.

It has further been found that the properties of the polyester can be improved by the addition of a polyisocyanate in an amount of 10–40%, preferably 15 to 25% by weight of the total of the polyisocyanate and polyester. Preferably, the polyisocyanate has at least three available isocyanate groups.

Among the polyisocyanates which can be employed there may be mentioned diisocyanates such as 2,4-tolylene diisocyanate, 2,6-tolylene diisocyanates, cyclopentylene diisocyanate, m-phenylene diisocyanate, p-phenylene diisocyanate, ethylene diisocyanate, butylidene diisocyanate, 1,5-naphthalene diisocyanate, 1,6-hexamethylene diisocyanate, dianisidine diisocyanate, 4,4'-diphenyl ether diisocyanate, 4,4',4''-triphenyl methane triisocyanate (desmodur R), the cyclic trimer of 2,4-tolylene diisocyanate, the cyclic trimer of 2,6-tolylene diisocyanate, mixtures of the cyclic trimers of 2,4-tolylene diisocyanate and 2,6-tolylene diisocyanate, the trimer of 4,4'-diphenyl methane diisocyanate, trifunctional isocyanate trimers having the formula:

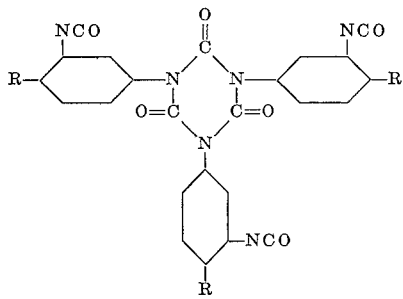

where R is a lower alkyl radical, e.g. n-butyl, tertiary butyl, secondary butyl, isopropyl, methyl, ethyl, etc., 1,3,5-triisocyanato benzene, 2,4,6-triisocyanate toluene, 4,4'-dimethyl-diphenylmethane, 2,2',5,5'-tetraisocyanate, 2,4,4'-triisocyanato diphenylmethane, 2,4,6-triisocyanato diphenyl ether, 2,2',4-triisocyanato diphenyl ether, 2,2',4-triisocyanato diphenyl sulfide, 2,4,4'-triisocyanato diphenyl sulfide, 2,3',4-triisocyanato-4'-methyl diphenyl ether, 2,3',4-triisocyanato - 4' - methoxydiphenyl ether, 2,4,4' - triisocyanato-3'-chlorodiphenyl ether, 2,4,4'-triisocyanato-3',5'-dimethyl diphenyl ether, 4,4',6-diphenyl triisocyanate, 1,2,4-butanetriol triisocyanate, 1,3,3-pentane triisocyanate, 1,2,2-butane triisocyanate, phloroglucinol triisocyanate, the reaction product of 3 mols of 2,4-tolylene diisocyanate with 1 mol of trimethylol propane, the reaction product of 3 mols of 2,6-tolylene diisocyanate with 1 mol of trimethylolpropane, the reaction product of 3 mols of 2,6-tolylene diisocyanate with 1 mol of trimethylol ethane, the reaction product of 3 mols of 2,4-tolylene diisocyanate with 1 mol of trimethylol ethanol and, in general, the reaction product of a diisocyanate with sufficient polyhydric alcohol to react with half the isocyanate groups.

While the polyisocyanates can be used as such, particularly where pot life is not important, it is preferred to block the isocyanate groupings with a group that will split off at the reaction temperature employed with the polymeric terephthalic or isophthalic ester. Typical compounds which can be used to block the isocyanate groupings, e.g., by forming carbamates therewith, are monohydric phenols, such as phenol, meta-cresol, para-cresol, ortho-cresol and mixtures thereof, the xylenols, e.g., 2,6-dimethyl phenol, 4-ethyl phenol, 4-tertiary butyl phenol, 2-butyl phenol, 4-n-octyl phenol, 4-isooctyl phenol, 2-chloro phenol, 2,6-dichloro phenol, 2-nitro-phenol, 4-nitro phenol, 3-nitro phenol, monohydric alcohols such as methyl alcohol, ethyl alcohol, n-propyl alcohol, isopropyl alcohol, tertiary butyl alcohol, tertiary amyl alcohol, octyl alcohol, stearyl alcohol, acetoacetic ester, hydroxyalkylcarbamic acid aryl esters, e.g., hydroxyethylcarbamic acid phenyl ester, hydroxyethylcarbamic acid cresyl ester, diethyl malonate, mercaptans, e.g., 2-mercaptobenzothiazole, 2-mercaptothiazoline, dodecyl mercaptan, ethyl 2-mercaptothiazole, p-naphthyl mercaptan, α-naphthyl mercaptan, methyl mercaptan, butyl mercaptan, lactams, e.g., ε-caprolactam, Δ-valerolactam, γ-butyrolactam, β-propiolactam, imides, e.g., succinimide, phthalamide, naphthalamide, glutarimide, dimethylphenyl carbinol, secondary amines, e.g., o-ditolylamine, m-ditolylamine, p-ditolylamine, N-phenyl toluidine, phenyl-α-naphthylamine, carbazole, diphenylamine, etc., mono-α-phenylethyl phenol, di-α-phenylethyl phenol, tri-α-phenylethyl phenol, carvacrol, thymol, methyl diphenyl carbinol, triphenyl carbinol, 1-nitro tetriary butyl carbinol, 1-chloro-tertiary butyl carbinol, triphenyl silanol, 2,2'-dinitrodiphenyl-amine, 2,2'-dichlorodiphenyl-amine, ethyl n-butyl malonate, ethyl benzyl malonate, acetyl acetone, acetonyl acetone, benzimidazole, 1-phenyl-3-methyl-5-pyrazolone.

As specific examples of such blocked polyisocyanates, there may be mentioned Mondur SH, wherein the isocyanate groups of the trimerized reaction product of 3 mols of mixed 2,4- and 2,6-tolylene diisocyanate and blocked by esterification with m-cresol. At present Mondur SH is the preferred polyisocyanate.

Other blocked polyisocyanates include the cyclic trimer of 2,4-tolylene diisocyanate having the isocyanate groups blocked with tertiary butyl alcohol or tertiary amyl alcohol or dimethyl ethinyl carbinol or aceto-acetic acid ester or phenol or cresylic acid or ε-caprolactam or 2-mercaptobenzothiazole or succinimide or phthalimide or diphenyl amine or phenyl-β-naphthyl amine, triphenyl methane triisocyanate having the isocyanate groups blocked with phenol or mixed cresols or tertiary butyl alcohol or phthalimide, 1,3,3-pentanetriisocyanate having the isocyanate groups blocked with m-cresol, etc.

Unless otherwise stated hereinafter in the specification and claims, it is understood that whenever the term "polyisocyanate" is employed, it is intended to include both the free isocyanates and the blocked isocyanates.

The polyisocyanate is mixed with the preformed polyester either dry or dissolved in a solvent prior to mixing. The reaction between the polyester and the polyisocyanate is hastened by using elevated temperatures and in preparing wire enamels they are usually reacted at a temperature of about 650 to 800° F.

The metal drier is preferably used in an amount of 0.2 to 1.0% metal based on the total solids in the enamel. Typical metal driers include the zinc, lead, calcium or cadmium linoleates, octoates, and resinates of each of these metals, e.g., zinc resinate, cadmium resinate, lead linoleate, calcium linoleate, zinc naphthenate, lead naphthenate, calcium naphthenate, cadmium naphthenate, zinc octoate and cadmium octoate. Other suitable metal drier, specifically polyvalent metal driers such as manganese naphthenate and cobalt naphthenate can be employed.

It has further been found that the properties of the polyester wire enamel can be improved by incorporating a tetra alkyl titanate in place of the metal drier and polyisocyanate. Typical tetra alkyl titanates are tetraisopropyl titanate, tetrabutyl titanate, tetrahexyl titanate, tetramethyl titanate and tetrapropyl titanate. The titanate is used in small amounts, e.g., 0.001 to 4.0% titanium metal on the total solids of the enamel.

The solvent employed in making the wire enamel is cresylic acid. Cresylic acid has a boiling range of 185 to 230° C. and is a mixture of o-, m-, and p-cresols. The individual cresols, e.g., para cresol, meta cresol or ortho cresol can be employed although it is preferred to use the commercial cresylic acid mixture.

It is frequently desirable to dilute the cresylic acid with an aromatic hydrocarbon, e.g., a heavy coal tar or petroleum naphtha or with xylene, etc. The naphtha can be employed in an amount of from 0 to 60%, e.g., 5 to 60%, based on the total weight of the solvents; preferably, the naphtha. Various conventional aromatic naphthas, especially high boiling naphthas can be employed such as EW naphtha (an enamel wire heavy coal tar naphtha sold by the Barrett Division of Allied Chemical and Dye Corporation) and Solvesso No. 100, an aromatic naphtha derived from petroleum.

There can also be employed aliphatic hydrocarbons such as n-decane, n-dodecane, isododecane and mixtures of aliphatic hydrocarbons such as Amsco 140 Solvent a mixture of aliphatic hydrocarbons having a distillation range of 355–400° F., a specific gravity of 0.781–0.785 and a Kauri-Butanol value of 32–33.5.

N-methyl pyrolidone also can be employed as a solvent.

It has also been found desirable to add a small amount, e.g., 0.05–1% based on the polyester, of an alkane dicarboxylic acid, e.g., succinic acid, glutamic acid, adipic acid, pimelic acid, sebacic acid or suberic acid to the final formulation.

The temperature of reaction is not especially critical and temperatures of 80° C. to reflux temperature can be employed.

The wire enamel can be applied to the wire, e.g., copper wire, by either the "free dip" or the die application procedure. In the following specific examples the die application procedure was employed to obtain a buildup of approximately 3 mils on No. 18 A.W.G. copper wire.

The tests employed on the coated wire are conventional in the wire enamel art, e.g., see Precopio Patent 2,936,296.

Unless otherwise indicated all parts and percentages are by weight.

EXAMPLE 1

| | |
|---|---:|
| Tris(2-hydroxyethyl)isocyanurate _____grams__ | 550 |
| Ethylene glycol _____do____ | 60 |
| 4,4'-dimethyl benzophenone dicarboxylate__do____ | 813.5 |
| Litharyl (catalyst) _____do____ | 0.55 |
| Xylol (solvent) _____cc__ | 300 |
| N-methyl pyrrolidone (solvent) _____cc__ | 250 |

The above mixture was reacted at a temperature of 420° F. until a hydroxyl value of 106 was reached. The product was then reduced to 49.4% solids with cresylic acid to produce Product A.

A wire enamel was prepared by mixing 810 grams of Product A, 320 grams of cresylic acid, 317 grams of Solvesso 100, 6.4 grams of tetraisopropyl titanate, 12 grams of Resimene 882-60 (butylated melamine formaldehyde), 2.68 grams of 18% zinc octoate in E. W. naphtha, 73.2 grams of Amsco 140 Solvent, 2.36 grams of adipic acid and 64 grams of Mondur SH. The wire enamel thus produced was applied on No. 18 gauge copper wire and produced an enamel which exhibited the following properties:

| | Wire speed | |
|---|---|---|
| | 30 ft./min. | 33 ft./min. |
| Appearance | Good | Good |
| Abrasion resistance (grams) | 1,500 | 1,420 |
| Heat Shock 175° C., 1x-2x-3x | 100-100-100 | 100-100-100 |
| Mandrel after snap | 5x | 4x |

EXAMPLE 2

| | |
|---|---:|
| Tris(2-hydroxyethyl)isocyanurate _____grams__ | 495 |
| Ethylene glycol _____do____ | 65.7 |
| 4,4'-dimethyl benzophenone dicarboxylate __do____ | 814 |
| Litharge _____do____ | 0.55 |
| Xylol _____cc____ | 300 |
| N-methyl pyrrolidone _____cc____ | 250 |

The above mixture was reacted at a temperature of 440° F. until a hydroxyl value of 113.5 was reached. The product was then reduced to 45.6% solids with cresylic acid to produce Product B.

A wire enamel was prepared by mixing 1096 grams of Product B, 404 grams of cresylic acid, 397 grams of Solvesso 100, 8.05 grams of tetraisopropyl titanate, 15 grams of Resimene 882-60, 3.35 grams of 18% zinc octoate in E.W. naphtha, 91.5 grams of Amsco 140 Solvent, 2194 grams of adipic acid and 80 grams of Mondur SH. The wire enamel thus produced was applied to No. 18 gauge copper wire and produced an enamel which exhibited the following properties:

| | Wire speed | |
|---|---|---|
| | 30 ft./min. | 33 ft./min. |
| Appearance | Good | Good |
| Abrasion resistance (grams) | 1,877 | 1,713 |
| Heat Shock 175° C., 1x-2x-3x | 100-100-100 | 100-100-100 |
| Mandrel after snap | 4x | 3x |

EXAMPLE 3

The procedure of Example 1 was repeated but in place of the 813.5 grams of 4,4'-dimethyl benzophenone dicarboxylate there was used a mixture of 407 grams of 4,4'-dimethyl benzophenone dicarboxylate and 225 grams of dimethyl terephthalate to produce a wire enamel.

EXAMPLE 4

The procedure of Example 1 was repeated but in place of the mixture of 550 grams of tris(2-hydroxyethyl)isocyanurate and 60 grams of ethylene glycol there was used 720 grams of tris(2-hydroxyethyl)isocyanurate to produce a wire enamel.

We claim:

1. A polymeric ester consisting of the reaction product of 4,4'-benzophenone dicarboxylic acid, tris(2-hydroxyethyl)isocyanurate and an alkanediol having 2-5 carbon atoms, the isocyanurate being at least 50% of the total of the isocyanurate and alkanediol on a weight basis.

2. A polymeric ester according to claim 1 wherein the alkanediol is ethylene glycol.

3. A polymeric ester according to claim 1 wherein the alkanediol is not over 50 equivalent percent of the total of the alkanediol and isocyanurate.

4. A polymeric ester according to claim 3 wherein the alkanediol is ethylene glycol.

5. An electrical conductor provided with a continuous coating of the polymeric ester of claim 1.

6. A polymeric ester according to claim 1 wherein the total number of hydroxyl groups on the alcohol component is from 1 to 1.6 times the total number of carboxyl groups on the acid component.

7. A polymeric ester according to claim 6 wherein the alkanediol is ethylene glycol.

References Cited

UNITED STATES PATENTS

| 1,813,838 | 7/1931 | Bruson _____ | 260—63 |
| 3,342,780 | 9/1967 | Meyer et al. _____ | 260—75 |
| 3,390,131 | 6/1968 | Roeser _____ | 260—75 |

WILLIAM H. SHORT, Primary Examiner

L. L. LEE, Assistant Examiner

U.S. Cl. X.R.

260—75, 775; 117—132, 128.4, 161